US011633992B2

(12) United States Patent
Sato

(10) Patent No.: US 11,633,992 B2
(45) Date of Patent: Apr. 25, 2023

(54) TIRE

(71) Applicant: TOYO TIRE Corporation, Itami (JP)

(72) Inventor: Yoshiki Sato, Itami (JP)

(73) Assignee: TOYO TIRE CORPORATION, Itami (JP)

(*) Notice: Subject to any disclaimer, the term of this patent is extended or adjusted under 35 U.S.C. 154(b) by 30 days.

(21) Appl. No.: 17/375,138

(22) Filed: Jul. 14, 2021

(65) Prior Publication Data

US 2022/0016942 A1    Jan. 20, 2022

(30) Foreign Application Priority Data

Jul. 17, 2020  (JP) .............................. JP2020-122631
May 31, 2021  (JP) .............................. JP2021-091409

(51) Int. Cl.
  *B60C 13/02* (2006.01)
  *B60C 13/00* (2006.01)
(52) U.S. Cl.
  CPC ............ *B60C 13/02* (2013.01); *B60C 13/002* (2013.01)
(58) Field of Classification Search
  CPC ................................ B60C 13/00; B60C 13/02
  See application file for complete search history.

(56) References Cited

U.S. PATENT DOCUMENTS

| 2012/0216930 | A1* | 8/2012 | Matsuda | ................. B60C 13/02 |
| | | | | 152/209.1 |
| 2017/0120689 | A1* | 5/2017 | Sato | ........................ B60C 13/02 |
| 2017/0210182 | A1 | 7/2017 | Mori et al. | |
| 2017/0259624 | A1* | 9/2017 | Satake | .................... B60C 13/02 |

FOREIGN PATENT DOCUMENTS

JP    2017-128267 A    7/2017

* cited by examiner

*Primary Examiner* — Robert C Dye
(74) *Attorney, Agent, or Firm* — WHDA, LLP

(57) ABSTRACT

The tire can achieve both cut resistance and mud drainage performance of the sidewall. The tire includes: a tread; sidewalls; and a plurality of side block groups on at least one of the sidewalls. Each of the side block groups protrudes from the sidewall reference plane. Each of the side block groups includes: a first side block; and a second side block. In each of said plurality of side block groups, the fi3 . . . 3rst side block 2 has a groove 23 extending from the second side block 3 toward an inside of the first side block in the tire circumferential direction D3, In each of said plurality of side block groups, the second side block 3 has a slope 35*c* whose height from the reference plane S2 becomes lower toward the first side block, such that the slope extends into the groove of the first side block.

15 Claims, 9 Drawing Sheets

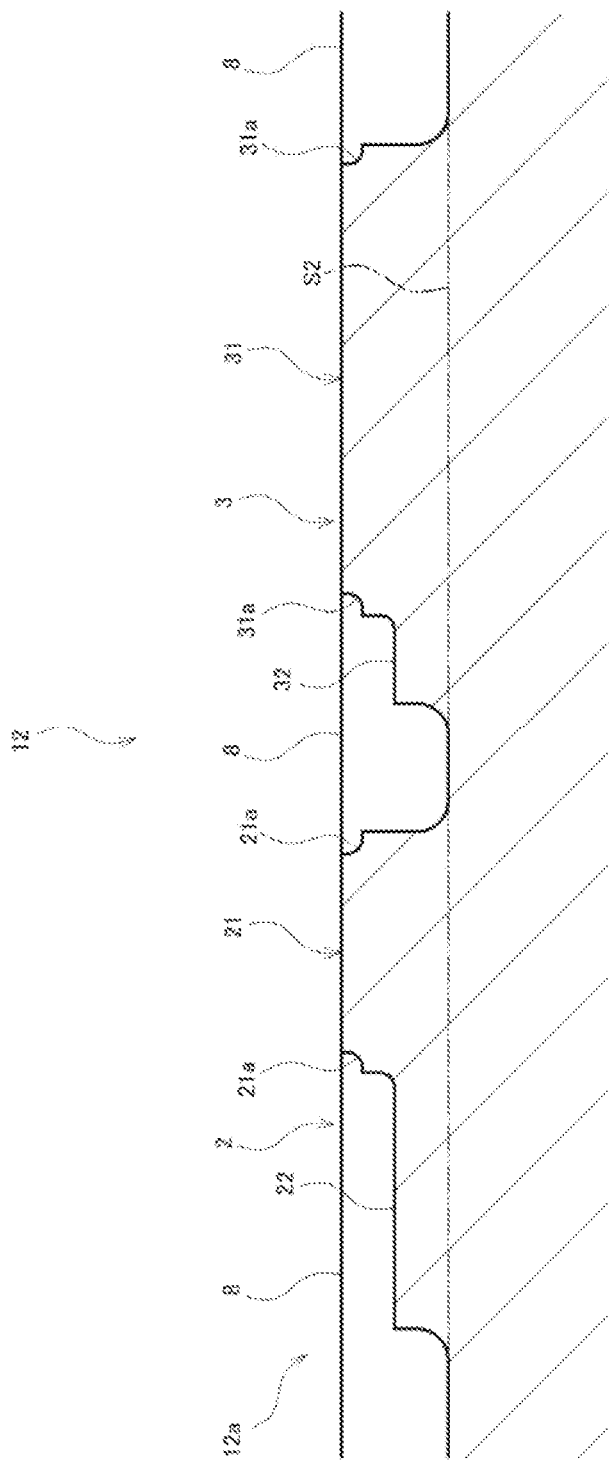

TIRE

TECHNICAL FIELD

The description here relates to a tire and in particular an improvement of a side block group provided on sidewalls of the tire.

TECHNICAL BACKGROUND

Conventionally, there has been known a tire which has a first protrusion and a second protrusion, the first protrusion protruding in the tire width direction of the tire, and the second protrusion protruding in the tire width direction and spaced away from the first protrusion in the tire circumference direction. For example, Patent Document No. 1 discloses a tire in which a sidewall is provided with a connecting portion extending in the tire circumferential direction so that the first protruding portion is connected to the second protruding portion, and projecting in the tire width direction.

As a result, not only the regions of the first protrusion and the second protrusion, but also the connecting portion can secure a rubber thickness at the region between the first protrusion and the second protrusion, so that the cut resistance of the sidewall can be improved. By the way, the protruding height of the connecting portion disclosed by Patent Document No. 1 is the same over the entire area, so as to be the same as the protruding height of the first protruding portion and the second protruding portion. As a result, the mud drainage between the first protruding portion and the second protruding portion could be hindered due to the connecting portion, so that the mud draining performance is deteriorated.

PRIOR ART REFERENCES

Patent References

Patent Reference No. 1: Japanese Laid-Open Patent Publication No. 2017-128267

SUMMARY OF THE INVENTION

The Objectives to Solve by the Invention

The object of the present disclosure is to provide a tire capable of achieving both cut resistance and mud drainage performance of the sidewall.

Means to Solve the Objectives

The tire according to the present disclosure includes a tread and sidewalls, and at least one of the sidewalls is provided with a plurality of side block groups protruding from a reference surface of the sidewall, and the plurality of side block groups includes first and second side blocks alternatively arranged in the tire circumferential direction. The first side block has a groove extending inward from the side surface facing the adjacent second side block, and the second side block has a lower height from the reference surface toward the adjacent first side block, and the slope extends into the groove of the adjacent first side block.

BRIEF DESCRIPTION OF THE DRAWINGS

FIG. 7 is an enlarged cross-sectional view taken along a line V-V of FIG. 4.

EMBODIMENTS TO CARRY OUT THE INVENTION

Next, an embodiment of the disclosure of the present application is explained with reference to the FIG. 1, FIG. 8.

Figure 1:
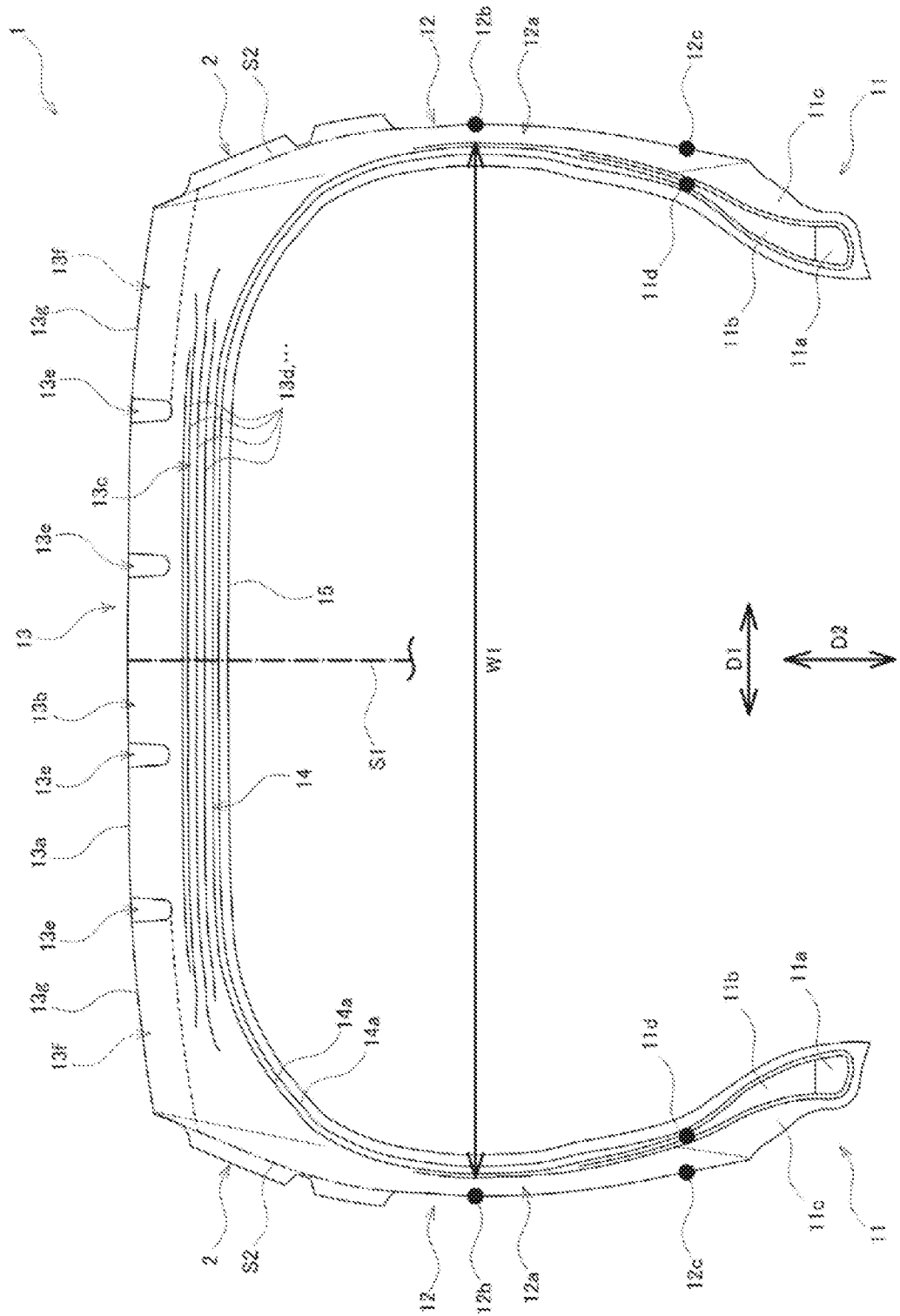
FIG. 1 is a cross-sectional view of a part of the tire according to an embodiment on a tire meridional surface.

FIG. 1 shows a tire 2 as an example of the embodiment, which includes a pair of beads 11, a sidewall 12 extending outward from each bead 11 in the tire radial direction D2, and a tread 13. The tread 13 has a tread surface 13a in contact with the ground and is connected to the outer end of each of the pair of sidewalls 12 in the tire radial direction D2. As will be described in detail later, the tire 2 has a plurality of side block groups protruding from the reference surface S2 provided on at least one of the pair of sidewalls 12. The tire 1 is mounted on a rim (not shown).

Figure 4:
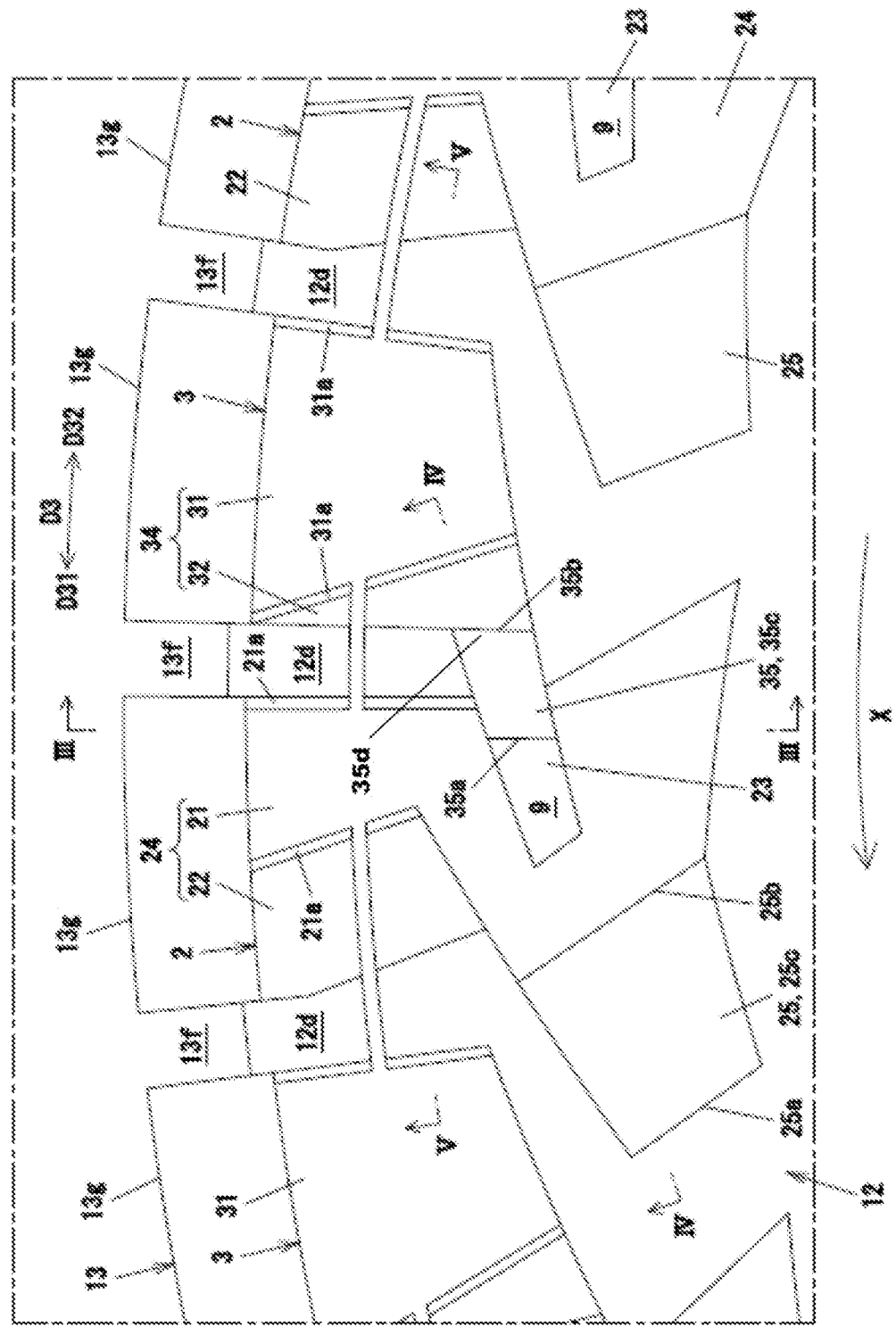
FIG. 4 is a side view of a part of the tire of the same embodiment above. (A view seen from the tire width direction).

In FIG. 1 and FIG. 4, the first direction D1 is the tire width direction D1 which is parallel to the tire rotation axis; the second direction D2 is the tire radial direction D2 which corresponds to the diameter direction of the tire 1; and the third direction D3 is the tire circumferential direction D3 which corresponds to the direction around the tire rotation axis. The tire equatorial plane S1 is a plane orthogonal to the tire rotation axis and is located at the center of the tire width direction D1, and the tire meridional plane is a plane including the tire rotation axis and is orthogonal to the tire equatorial plane S1.

In the tire width direction D1, the inside refers to a side coming close to the tire equatorial plane S1, and the outside refers to a side going away from the tire equatorial plane S1. Also, in the tire radial direction D2, the inside refers to a side coming close to the tire rotation axis, and the outside refers to a side going away from the tire rotation axis.

The bead 11 includes a bead core 11a formed in an annular shape and a bead filler 11b provided at the outside of the bead core 11a in the tire radial direction D2. For example, the bead core 11a is formed by laminating rubber-coated bead wires (for example, metal wires), and the bead filler 11b is formed of a hard rubber formed in a tapered shape tapering outward in the tire radial direction D2.

Also, the tire 1 includes a carcass 14 bridging between the pair of bead cores 11a, 11a, and an inner liner 15 arranged inside the carcass 14 which faces the internal space of the tire 1 filled with air. The carcass 14 and the inner liner 15 are arranged along the inner circumference of the tire over the bead 11, the sidewall 12, and the tread 13.

The bead 11 includes a rim strip rubber 11c arranged outside the carcass 14 in the tire width direction D1. The rim strip rubber 11c constitutes the outer surface of the bead 11 to be in contact with the rim. The sidewall 12 includes a sidewall rubber 12a arranged outside the carcass 14 in the tire width direction D1. The sidewall rubber 12a constitutes the outer surface of the sidewall 12.

The tread 13 includes a tread rubber 13b as a tread surface 13a, and a belt 13c arranged between the tread rubber 13b and the carcass 14. The belt 13c includes a plurality of belt plies 13d (four in FIG. 1). For example, the belt ply 13d includes a plurality of belt cords (for example, organic fibers and metals) arranged in parallel with each other, and a topping rubber for coating the belt cords.

The carcass 14 is composed of at least one carcass ply 14a (two in FIG. 1). The carcass ply 14a is folded around the bead core 11a, thereby surrounding the bead core 11a. Also, the carcass ply 14a includes a plurality of ply cords (for example, organic fibers and metals) arranged in a direction substantially orthogonal to the tire circumferential direction D3, and a topping rubber for covering the ply cords.

The inner liner 15 has a function excellent in blocking gas permeation in order to maintain the air pressure of the tire 1. In the present embodiment, in the sidewall 12, the inner liner 15 is in close contact with the inner peripheral side of the carcass 14, and no other member is interposed between the inner liner 15 and the carcass 14. However, additional member can be provided between the carcass 14 and the inner liner 15.

The thickness of the inner liner 15 on the sidewall 12 is, for example, in a range of 90% to 180%, or 120% to 160%, of the thickness of the inner liner 15 on the tread 13. When additional member is provided between the carcass 14 and the inner liner 15, the relationship above is satisfied by the shortest distance (Dm) from the carcass ply 14a arranged on the innermost peripheral side to the inner peripheral surface of the tire (inner peripheral surface of the inner liner 15). That is, the distance (Dm) on the sidewall 12 can be 90% to 180%, or 120% to 160%, of the distance (Dm) on the tread 13

Figure 2:
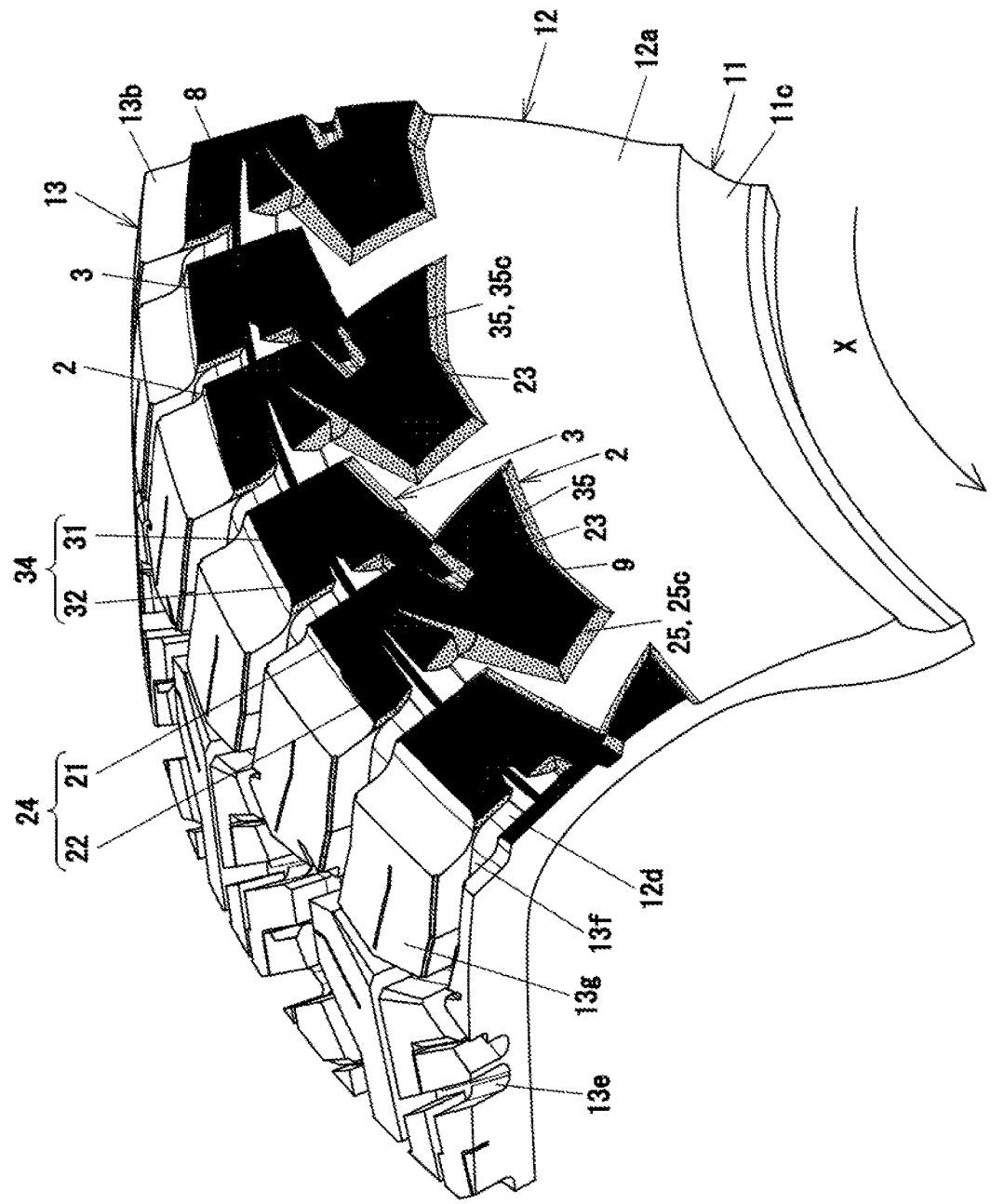
FIG. 2 is a perspective view showing a part of the tire of the same embodiment above.
Figure 3:
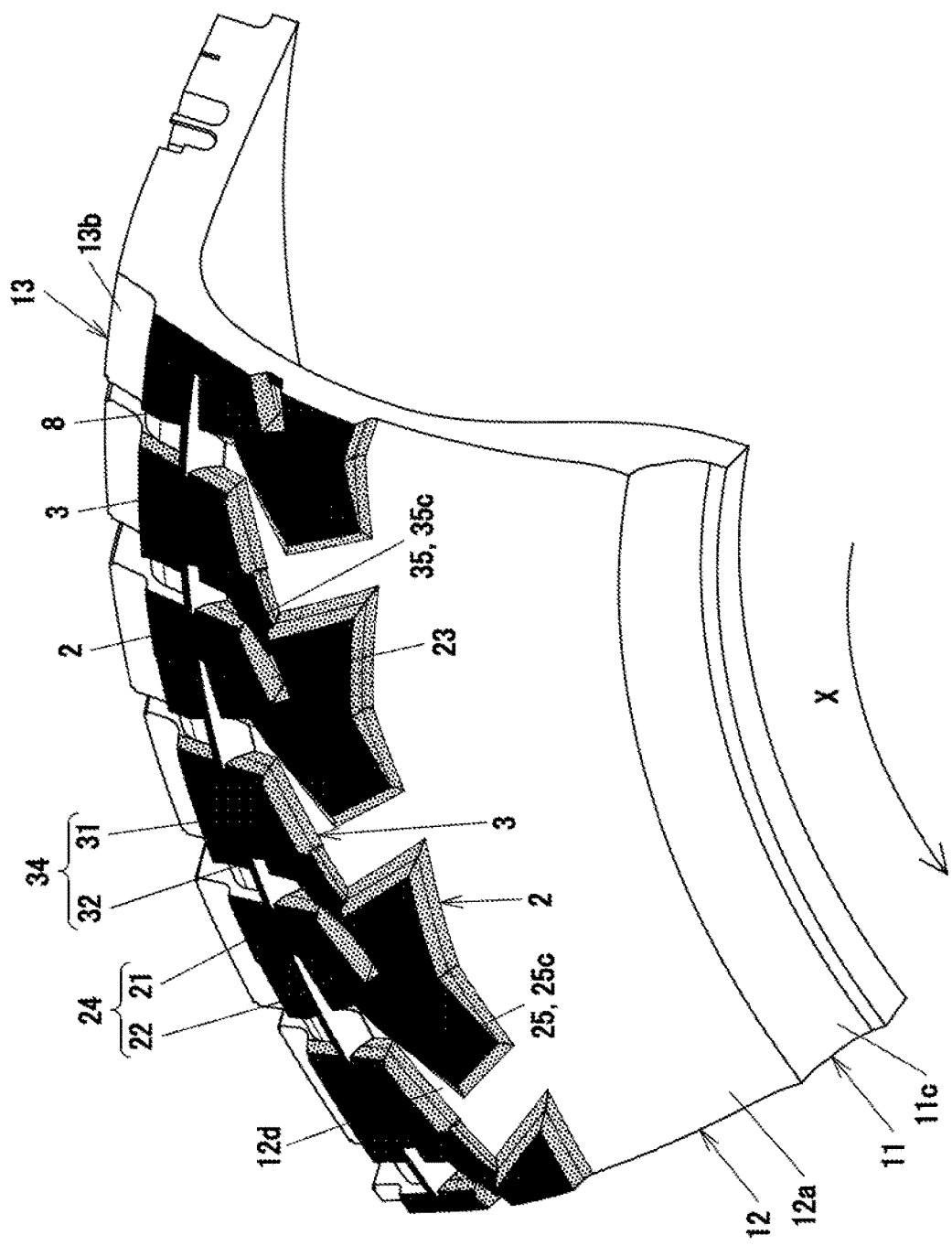
FIG. 3 is a perspective view showing a part of the tire of the same embodiment above.

As shown in FIG. 1 to FIG. 3, the tread rubber 13b is provided with a plurality of main grooves 13e extending in the tire circumferential direction D3, a plurality of auxiliary grooves 13f extending in the tire width direction D1, and a plurality of blocks 13g divided by the main groove 13e and the auxiliary grooves 13f. A plurality of the blocks 13g are arranged to line up in the tire circumferential direction D3. A plurality of the blocks 13g preferably include a plurality of shoulder blocks arranged along the ground contact end of the tread 13. Also, it is preferable that a plurality of the auxiliary grooves 13f extend beyond the ground contact end of the tread 13 to reach the outer end of the tire width direction D1 of the tread 13. As a result, a good performance of water drainage and mud drainage of the dread 13 can be expected. In the present disclosure, the tread pattern is not particularly limited In FIG. 2 and FIG. 3, the main rotation direction of the tire 1 is indicated by an arrow X. In the present specification, the "tire main rotation direction" corresponds to the rotation direction when the vehicle on which the tire 1 is mounted moves forward. In the present specification, the terms "left" and "right" are used for convenience of explanation for the tire 1 and its components. The "right side" of the tire 1 corresponds to the right side when the tire 1 mounted on the vehicle is viewed from the front of the vehicle, and the "left side" corresponds to the left side when the tire 1 mounted on the vehicle is viewed from the front of the vehicle.

FIG. 2 and FIG. 3 show the sidewall 12 on the right side of the tire 1. The sidewall 12 has a plurality of side block groups as described above. The block pattern of the sidewall 12 at the left side can be the same as the block pattern of the sidewall 12 at the right side. The side block groups of the sidewalls 12 at the left and right sides can be formed in such a point-symmetric pattern that can overlap with the original shape when the tire 1 is rotated 180° around an axis along the tire radial direction D2 passing through the tire equatorial plane S1, but it can be formed in a completely different pattern from each other. In the tire according to the present disclosure, the first side block 2 and the second side block 3, which will be described later, are formed on at least one of the left and right sidewalls.

The side wall of each side block group is not perpendicular to the upper surface of the block but is curved to spread outward from the upper side to the lower side of the block. At least a part of the side wall is curved to be convex toward the inside of the block.

Figure 5:
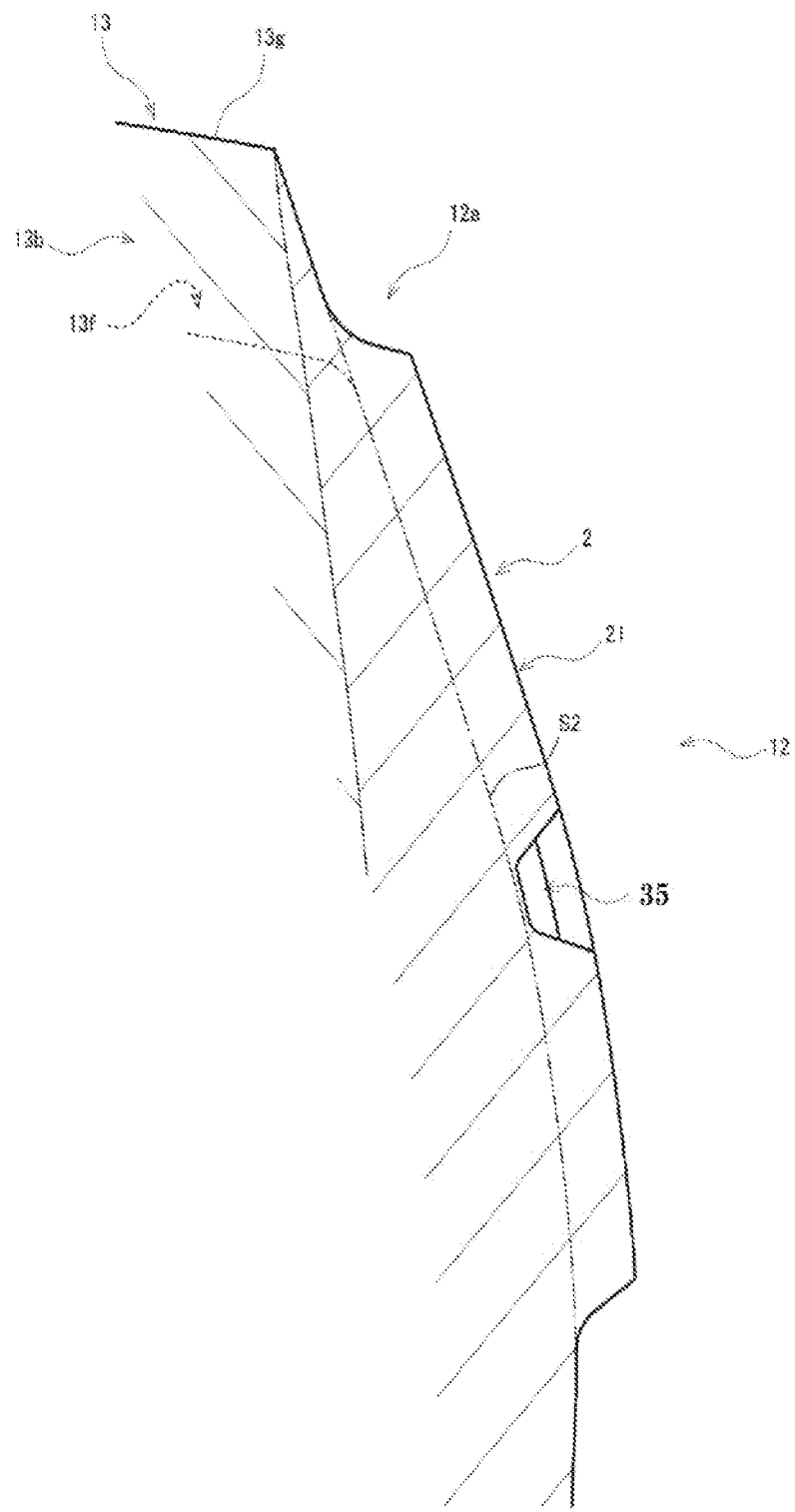
FIG. 5 is an enlarged cross-sectional view taken along a line III-III of FIG. 4.
Figure 6:
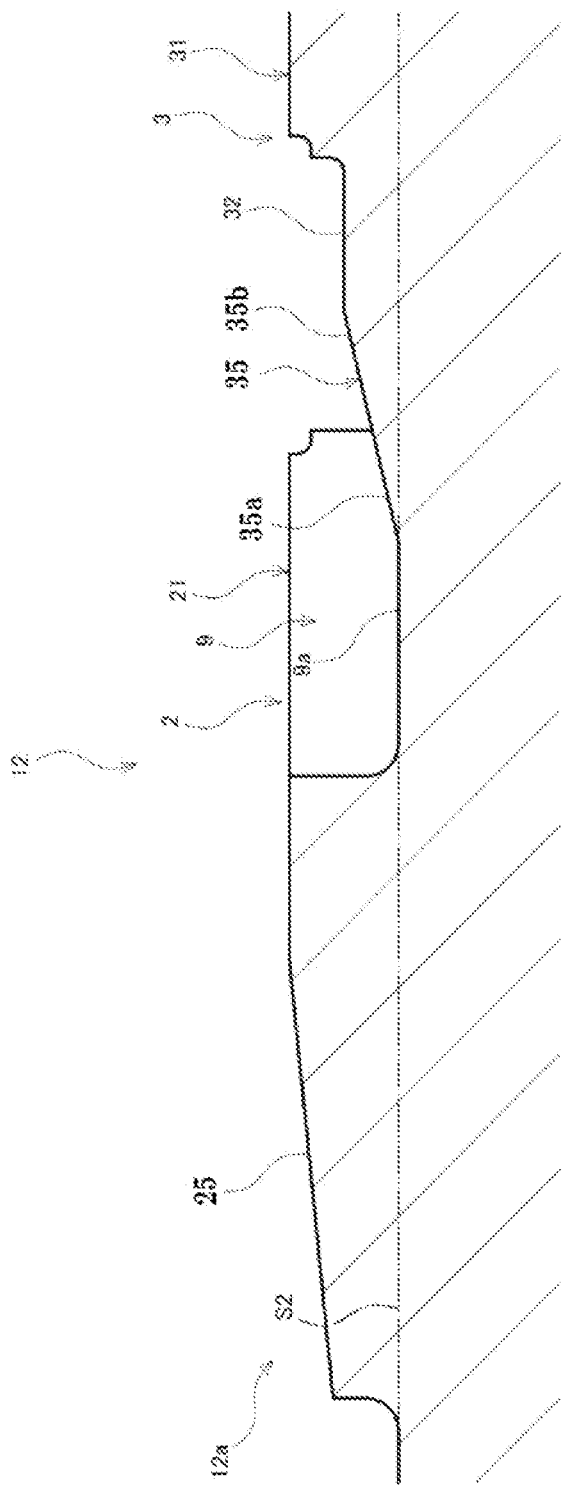
FIG. 6 is an enlarged cross-sectional view taken along a line IV-IV of FIG. 4.

Hereinafter, the configuration of the sidewall 12 is described in detail with reference to FIG. 2 to FIG. 4. For convenience of explanation. FIG. 4 shows a diagram schematically showing the side view shape of each side block group, assuming that the side wall of each side block group is perpendicular to the upper surface of the block. Each of FIG. 5 to FIG. 7 is a view showing a part of the cross section at lines III-III, IV-IV, and V-V in FIG. 4, respectively. In the following explanation, FIG. 5 to FIG. 7 are referred to if necessary.

As shown in FIG. 2 to FIG. 4, a plurality of the side block groups formed on the sidewall 12 include a first side block 2 and a second side block 3 which are alternately arranged with a space therebetween in the tire circumferential direction. Each side block group is of a protrusion protruding outward in the tire width direction from the reference surface S2 (see FIGS. 1, 5 to 7) of the sidewall 12, and is formed on the sidewall rubber 12a constituting the outer surface of the sidewall 12. The sidewall rubber 12a is thickened at the portion where the side block group is formed, so that the durability against an external impact is high. That is, the sidewall 12 on which the side block group is formed is strong against an impact from the outside and has excellent cut resistance.

Here, the reference surface S2 means the outer surface of the sidewall 12 where the side block group does not exist. In other words, it is a virtual surface under the side block group, which is a surface along the outer surface of the sidewall 12 of the portion where the side block group is not formed. The reference plane of the sidewall 12 can be called as a profile plane. In the cross section of the tire meridional surface, the outer surface of the sidewall 12 can be composed of a plurality of arcs having different radii of curvature.

As described above, a plurality of the side block groups can improve the cut resistance of the sidewall 12 and protect the sidewall 12 when traveling on a rough road such as a rocky road surface. Considering only the cut resistance, it may be sufficient to simply arrange a large side block group. However, considering the running performance of a muddy road surface with ruts, it is necessary to provide side block groups that enhance a mud drainage performance of the tire and exhibits good side traction. In order to improve the mud drainage performance of the sidewall 12, it is necessary to form an appropriate uneven pattern along the tire circumferential direction. Therefore, in general, there is a trade-off between the cut resistance performance and the mud drainage performance of the sidewall 12.

As a result of diligent studies on such objectives, the inventor the present application has achieved a good mud drainage performance while ensuring excellent cut resistance by improving the side block group. The side block group including the first side block 2 and the second side block 3 is formed on the sidewall 12, so that the cut resistance performance and the road drainage performance of the sidewall 12 can be highly compatible with each other.

The first side block 2 and the second side block 3 are alternately arranged one by one with a space 12*d* in the tire circumferential direction. Both of the first side block 2 and the second side block 3 are projection portions protruding from the reference surface S2 but have different shapes and sizes from each other. The sidewall 12 is provided with an equal number of these two types of side blocks. The space 12*d* formed between the side blocks is connected to the auxiliary groove 13*f* of the tread 13. In the side view of the tire 1, the space 12*d* and the auxiliary groove 13*f* are arranged to align in the tire radial direction, and the side block and the block 13*g* are arranged to align in the tire radial direction.

As shown in FIG. 5, the auxiliary groove 13*f* and the block 13*g* of the tread 13 can be arranged to be continued to the sidewall 12. In particular, each of the outer end portion of the tire width direction D1 of the auxiliary groove 13*f* and the outer end portion of the tire width direction D1 of the block 13*g* can be arranged on the sidewall 12. Also, each of the outer end portion of the tire width direction D1 of the auxiliary groove 13*f* and the outer end portion of the tire width direction D1 of the block 13*g* can be formed of the sidewall rubber 12*a*.

The outer end of the tire radial direction D2 of the first side block 2 can be arranged outside the groove bottom of the auxiliary groove 13*f* in the tire radial direction D2. The outer end of the tire radial direction D2 of the first side block 2 can be connected to the outer end of the tire width direction D1 of the block 13*g*. The outer end of the tire radial direction D2 of the second side block 3 can be also arranged outside the groove bottom of the auxiliary groove 13*f* in the tire radial direction D2. Also, the outer end of the tire radial direction D2 of the second side block 3 can be connected to the outer end of the tire width direction D1 of the block 13*g*.

The first side block 2 and the second side block 3 are preferably arranged at least on the outer portion of the sidewall 12 in the tire radial direction D2. In the embodiment of the present application, each side block is arranged outside the bead end position 12*c* (see FIG. 1) of the sidewall 12 in the tire radial direction D2. In addition, each side block is preferably arranged outside the tire maximum width position 12*b* (see FIG. 1) of the sidewall 12 in the tire radial direction D2.

Here, the bead end position 12*c* is a position on the outer surface of the sidewall 12 which corresponds to the outer end 11*d* of the tire radial direction D2 of the bead filler 11*b* with respect to the tire width direction D1 (see FIG. 1). The tire maximum width position 12*b* is a position of the outer surface of the sidewall 12 where the distance W1 as shown in FIG. 1 becomes maximum with respect to the tire width direction D1. The distance W1 is the distance along the tire width direction D1 from the outer surface of the carcass 14 on the left sidewall 12 to the outer surface of the carcass 14 on the right sidewall 12.

By arranging each side block on the outer portion of the sidewall 12 in the tire radial direction D2, when the tire 1 sinks in a muddy area or a sandy area due to the weight of the vehicle, each side block comes into contact with the mud or sand to show a large side traction effect. In addition, each side block can contact uneven rocks in a rocky area. That is, each side block can contact the ground on rough roads such as muddy ground, sandy ground and rocky ground. It is noted that each side block does not touch the ground during normal driving on flat roads.

The first side block 2 is larger than the second side block 3 and extends inward in the tire radial direction with respect to the second side block 3. As will be described in detail later, the second side block 3 has a first portion extending in the tire radial direction, and a second portion extending from the first portion in the tire circumferential direction and including a slope 35*c*. In the embodiment of the present application, the first portion is the main portion 34 and the second portion is an inclined portion 35. The second side block 3 is connected to the first side block 2 located at the front side of the tire main rotation direction with respect to the second side block 3 via the inclined portion 35.

The sidewall 12 is arranged to have a pair of two types of side blocks connected via the inclined portion 35 at an equal interval along the tire circumferential direction. The arrangement of the pair of side blocks as regularly repeated as described above can achieve both excellent cut resistance and mud drainage performance, thereby improving a steering stability when traveling on rough roads.

Hereinafter, for convenience of explanation, the tire main rotation direction is referred to as "direction D31", and the direction opposite to the tire main rotation direction is referred to as "direction D32" (see FIG. 4). The tire 1 is preferably used in such a manner that the direction indicated by the arrow X is the main rotation direction, but it is also possible to be used in such a manner that the direction opposite to the arrow X becomes the main rotation direction.

Both the first side block 2 and the second side block 3 extend inward in the tire radial direction from the side of the tread 13. A portion of each side block located inside in the tire radial direction extends in the direction D31 (forwarding side in the tire main rotation direction). The first side block 2 extends to a position to align with the second side block 3 located at the side of the direction D31 in the tire radial direction. That is, in the tire radial direction, a part of the first side block 2 overlaps the second side block 3 of the adjacent side block pair that is not connected by the inclined portion 35. A part of the first side block 2 is arranged inside the second side block 3 in the tire radial direction so as to be opposed to the second side block 3 with a space 12*d*.

The first side block 2 has a third portion extending in the tire radial direction, and a fourth portion extending from the third portion in the tire circumferential direction. In the embodiment of the present application, the third portion is the main portion 24 including the second region 21 and the first region 22, and the fourth portion is an inclined portion 25 overlapping the second side block 3 in the tire radial direction at the side of the direction D31. The first region 22 is a portion having a lower height from the reference plane S2 than the second region 21. The first side block 2 further has a groove 23 extending inward from the side surface thereof which faces the adjacent second side block 3 at the side of the direction D32 and has a substantially sickle shape as a whole. As will be described in detail later, the inclined portion 35 of the second side block 3 is formed in the groove 23, and the tip 35*a* thereof is located in the groove 23.

Similar to the first side block 2, the second side block 3 has a main portion 34 including the fourth region 31 and the third region 32, and an inclined portion 35 including a lowered slope 35*c* whose height from the reference plane S2 is lowered toward the adjacent first side block 2. The third region 32 is a portion having a lower height from the reference plane S2 than the fourth region 31. The inclined portion 35 extends in the tire circumferential direction to be connected to the first side block 2 and is formed in the groove 23. The second side block 3 includes the inclined portion 35 extending from the inner end side of the tire radial direction of the main portion 34 along the tire circumferential direction (direction D31), thereby having a substantially L shape as a whole.

In the embodiment of the present application, each of the main portions 24 and 34 of each side block includes a region having a higher height from the reference surface S2 (high protrusion portion) and a region having a lower height from the reference plane (low protrusion portion), adjacently arranged in the tire circumferential direction. Furthermore, in each of the main portions 24 and 34, the low protrusion portion is arranged at the side of the direction D31, and the high protrusion portion is arranged at the side of the direction D32. As a result, the sidewall 12 includes the first region 22 and the second region 21 of the first side block 2, and the third region 32 and the fourth region 31 of the second side block 3 in this order along the tire circumferential direction, thereby providing a regular protrusion as formed. In addition, a space 12d provided between the side blocks is lower in height than the low protrusion portion. Such a protrusion structure can accomplish a large side traction effect as well as highly achieve both cut resistance and mud drainage performance.

In the embodiment of the present application, the second region 21 of the first side block 2 is higher than the third region 32 of the second side block 3 with respect to the reference plane S2, and the fourth region 31 of the second side block 3 is higher than the first region 22 of the first side block 2 with respect to the reference plane S2. The relationship between the height of the second region 21 of the first side block 2 and the height of the fourth region 31 of the second side block 3 is not particularly limited, but in the embodiment of the present application, the height of each of the high protrusion portions is the same with respect to the reference surface S2. In this case, uniform cut resistance can be obtained along the tire circumferential direction. Also, the height of the first region 22 of the first side block 2 with respect to the reference surface S2 is the same as the height of the third region 32 of the second side block 3. In this case, uniform mud drainage performance can be obtained along the tire circumferential direction.

The sidewall 12 can be provided with a side rib 3 protruded from the reference surface S2. The side rib 3 extends in the tire circumferential direction and is a protrusion in a shape of a gently curved arc and fine line, so that it crosses the space 12d in the vicinity of the tread 13, thereby connecting adjacent side blocks. The height of the side rib 8 is not particularly limited, but in the embodiment of the present application, it has the same height as that of each of the high protrusion portions (second region 21 and fourth region 31) of each side block. The side rib 8 further crosses the low protrusions (first region 22 and third region 32) of each side block, thereby connecting the high protrusions of adjacent side blocks. That is, the side rib 8 has a higher height from the reference surface S2 than the first region 22 and the third region 32 and connects the second region 21 with the fourth region 31. For example, the side rib 3 contributes to the improvement of cut resistance and side traction performance along with the side block.

Hereinafter, each of the first side block 2 and the second side block 3 are described in more detail.

<First Side Block 2>

The first side block 2 has a groove 23 extending in the direction D31 from the side surface thereof which is opposed to the adjacent second side block 3. The groove 23 extends toward the inside of the main portion 24 of the first side block 2 and has a concave shape or U shape in a side view (e.g., a cross-section view including the tire meridional plane), and ends at the inside of the first side block 2. The main portion 24 includes a first region 22 and a second region 21 that is higher than the first region 22 with respect to the reference plane S2. In the embodiment of the present application, the groove 23 opens toward the direction D32, and the three sides other than this opening of the groove 23 is surrounded by the second region 21.

The first side block 2 has an inclined portion 25 extending toward the direction D31, the extension direction of the inclined portion 25 being opposite to the extension direction of the groove 23 on an extension line of the groove 23. The first side block 2 is formed in a substantially sickle shape as a whole by including a groove 23 extending in the tire circumferential direction, a main portion 24 extending in the tire radial direction, and the inclined portion 25. The substantially sickle-shaped first side block 2 has an edge extending in the tire circumferential direction and the radial direction, thereby improving more effectively the side traction performance of the tire 1.

[Groove 23]

The groove 23 is a portion in which the three sides thereof are surrounded by the second region 21 (i.e., one side in the tire radial direction and two sides in the direction D31) and has a height from the reference surface S2 that is lower than the surroundings. The height at the deepest portion of the groove 23 can be the same as the height of the reference surface S2. The inclined portion 35 of the second side block 3 including the inclined surface 35c whose height from the reference surface S2 gradually decreases toward the tip end 35a is inserted in at least a part of the groove 23, so that there is an area in which the height of the bottom surface changes. As described in detail later, the wall of the groove 23 is higher than the slope 35c with respect to the reference surface S2.

The groove 23 is preferably formed longer in the tire circumferential direction than in the tire radial direction. The length of the groove 23 in the tire circumferential (hereinafter referred to as "length L23") is not particularly limited, but for example, it is 30% to 70% of the tire circumferential length of the main portion 24. The length of the groove 23 in the tire radial direction (hereinafter referred to as "width W23") is preferably 50% or less of the length L23, and for example, it is 20% to 50%. The width W23 of the groove 23 can be constant over the entire length of the groove 23, but in the embodiment of the present application, the width W23 gradually narrows from the opening toward the end.

The groove 23 can be formed parallel to the tire circumferential direction, but in the embodiment of the present application, the groove 23 is inclined with respect to the tire circumferential direction such that at least a part of the end is located inside at least a part of the opening with respect to the tire radial direction. That is, the groove 23 ends inside the first side block 2 and is inclined with respect to the tire circumferential direction such that it is gradually located inward in the tire radial direction as the distance from the base edge 35b of the inclined portion 35 increases. In addition, there is a space 9 in the groove 23, the space 9 surrounded by the second region 21 and the inclined portion 35 of the second side block 3 and having a height lower than the surroundings. An edge is formed around the space 9 such that the edge can provide a traction effect in various directions.

As shown in FIG. 6, the bottom surface 9a of the space 9 is formed at the same height as the reference surface S2, and for example, it becomes the deepest portion of the groove 23. In the embodiment of the present application, the tip 35a of the inclined portion 35 is located at a position away from the end of the groove 23 such that it is located closer to the opening than the end of the groove 23. That is, the length of the space 9 in the tire circumferential direction is longer than the length in the tire circumferential direction of the portion of the inclined portion 35 existing in the groove 23.

[Main Portion 24]

The main portion 24 extends more inward in the tire radial direction than the main portion 34 of the second side block 3 such that it is formed larger than the main portion 34. The second region 21 of the main portion 24 is larger than the first region 22, and the portion of the main portion 24 located at the inside of the tire radial direction is composed of only the second region 21. As described above, the second region 21 and the first region 22 are adjacent to each other in the tire circumferential direction in the vicinity of the tread 13, the second region 21 is arranged at the side of the direction D32, and the first region 22 is arranged at the side of the direction D31. In the vicinity of the tread 13, the second region 21 and the first region 22 are formed to have the same size, or the first region 22 is formed larger than the second region 21.

In the embodiment of the present application, the second region 21 is also arranged at the inside of the tire radial direction D2 beyond the first region 22 and is connected to the inner end of the tire radial direction D2 of the first region 22. The second region 21 can be provided with a recess 21a extending in the tire radial direction D2 at the end on the side in the tire circumferential direction D3 thereof. Details of the recess 21a is described later.

The second region 21 extends from the side of the tread 13 beyond the side rib 6 to be extended to the inward of the tire radial direction and is then bent toward the direction D31 along the inner end of the tire radial direction of the first region 22. Also, the second region 21 thus extended along the inner end of the tire radial direction of the first region 22 is bent again around the groove-shaped space 23 to be then extended toward the direction D32. This space is the groove 23, and the second region 21 has a substantially sickle shape as a whole, in the same manner as the first side block 2. The portion of the second region 21 which is located inside the groove 23 in the tire radial direction is extended to a position in such a manner that it overlaps the main portion 34 of the second side block 3 located on the side of the direction D32 in the tire radial direction.

As shown in FIG. 7, the height of the first region 22 can be, for example, about ½ of the height of the second region 21. The height of the first region 22 from the reference surface S2 is not particularly limited, but for example, it can be 30% to 70% of the height of the second region 21 from the reference surface S2. The first region 22 extends from the side of the tread 13 beyond the side rib 8 to be extended to the inward of the tire radial direction, such that it has a substantially rectangular shape in a side view. The length of the first region 22 in the tire radial direction is shorter than the length of the second region 21 in the tire radial direction, and the inside of the tire radial direction of the first region 22 is provided with the second region 21 extending toward the direction D31.

[Inclined Portion 2]

The inclined portion 25 extends from an end portion of the main portion 24 at the side of the direction D31. The inclined portion 25 has an inclined surface 25c whose height from the reference surface S2 becomes lower toward the tip end 25a. In the embodiment of the present application, the inclined portion 25 is located on the extension line of the groove 23, and like the groove 23, it is tilted with respect to the tire circumferential direction such that at least a part of the side of the tip 25a is located at more inside of the tire radial direction than at least a part of the base edge 25b connected to the main portion 24. The inclined portion 25 has a substantially rectangular shape in a side view. The length of the inclined portion 25 in the tire radial direction gradually decreases from the base edge 25b toward the tip end 25a.

As described above, the inclined portion 25 is extended to a position to overlap the second side block 3 at the side of the direction D31 in the tire radial direction and is opposed to the second side block 3 with a space 12d. The inclined portion 25 is further arranged to be opposed to the main portion 24 of the first side block 2 at the side of the direction D31 with the space 12d. The gap 12d is formed in a substantially L shape between the inclined portion 25 and the side block pair adjacently located at the side of the direction D31. Also, the side wall located at the inner end of the tire radial direction of the first side block 2 is inclined so as to be convex toward the outer side in the tire radial direction, such that it is bent at the boundary between the main portion 24 and the inclined portion 25.

The slope 25c of the inclined portion 25 is inclined such that the height from the reference surface S2 gradually decreases from the side of base edge 25b toward the side of the tip end 25a. That is, the slope 25c is inclined so as to approach the reference surface S2 as going to the tip 25a. The inclined portion 25 including the slope 25c contributes to both the cut resistance performance and the mud draining performance of the sidewall 12 in the same manner as the inclined portion 35 including the slope 35c. The inclination angle of the slope 25c of the inclined portion 25 with respect to the reference surface S2 is, for example, smaller than the inclination angle of the slope 35c of the inclined portion 35 with respect to the reference surface S2 (see FIG. 6)

<Second Side block 3>

The second side block 3 has a rectangular main portion 34 extending in the tire radial direction and an inclined portion 35 extending in the tire circumferential direction from the side of the inner end of the tire radial direction of the main portion 34, such that it is substantially L as a whole. A side wall of the main portion 34 located near the inner end of the tire radial direction of the second side block 3 is formed on the same straight line as the side wall of the inclined portion 35. The inclined portion 35 extends in the tire circumferential direction to be connected to the first side block 2 and is formed in the groove 23. The inclined portion 35 is an extending portion extending from the end portion of the main portion 34 toward the direction D31 and is connected to the first side block 2 inside the groove 23.

The inclined portion 35, which is a portion including the inclined surface 35c, is connected to the first side block 2 inside the groove 23 of the first side block 2. In the embodiment of the present application, the slope 35c is formed over the entire length of the inclined portion 35, and therefore, the starting point of the slope 35c corresponds to the base edge 35b of the inclined portion 35. The starting point of the slope 35c is a portion where the height of the slope 35c begins to decrease, and therefore, the height from the reference surface S1 is the highest. The base edge 35b of the inclined portion 35 is the base of the inclined portion 35 which is connected to the main portion 34. Also, the end of the slope 35c, which is the end opposite to the starting point, corresponds to the tip 35a of the inclined portion 35, which is the end opposite to the base edge 35b.

[Main Portion 34]

The main portion 34 is smaller than the main portion 24 of the first side block 2, and the three sides thereof (that is, the inner side of the tire radial direction and both sides in the tire circumferential direction) are surrounded by two first side blocks 2 with the space 12d. The fourth region 31 of the main portion 34 is formed in a rectangular shape in a side view in which the length in the tire circumferential direction is gradually shortened from the side of the tread 13 toward the inside in the tire radial direction. On the other hand, the third region 32 has a length in the tire circumferential direction which is gradually increased from the side of the tread 13 toward the inside in the tire radial direction and is formed in a substantially triangular shape in a side view.

The main portion 34 includes a third region 32 and a fourth region 31 that is higher than the third region 32 with respect to the reference plane S2. As described above, the fourth region 31 and the third region 32 are adjacent to each other in the tire circumferential direction, the fourth region 31 is arranged on the side of the direction D32, and the third region 32 is arranged on the side of the direction D31. In the embodiment of the present application, the inclined portion 35 extends from the end portion of the third region 32 toward the direction D31. That is, the third region 32 is interposed between the fourth region 31 and the inclined portion 35. The main portion 34 has a third region 32 whose height from the reference surface S2 is the same as, or lower than, the starting point of the slope 35c (base end 35b of the slope 35), and the third region 32 is adjacent to the slope 35c. The fourth region 31 of the main portion 34 is located at a position away from the slope 35c. In this case, good mud drainage performance is ensured by the two side blocks connected by the inclined portion 35.

As shown in FIG. 7, the height of the third region 32 can be, for example, about ½ of the height of the fourth region 31. The height of the third region 32 from the reference surface S2 is not particularly limited, but for example, it can be 30% to 70% of the height of the fourth region 31 from the reference surface S2. In the embodiment of the present application, as described above, the height of the fourth region 31 and the height of the second region 21 of the first side block 2 are the same, and these protruding portions are connected with each other in the tire circumferential direction via the side rib 8. Also, the height of the third region 32 and the height of the first region 22 of the first side block 2 are the same.

[Inclined Portion 35]

As described above, the inclined portion 35 has a slope 35c whose height from the reference surface S2 gradually decreases from the side of the base edge 35b connected to the third region 32 of the main portion 34 toward the side of the tip 35a located in the groove 23. As a result, good mud drainage performance can be ensured between the two side blocks provided with the inclined portion 35 to improve the cut resistance. Regarding the height of the inclined portion 35 (slope 35c) from the reference surface S2, for example, the highest portion is at the base edge 35b and the lowest portion is at the tip 35a.

The slope 35c can be of a curved surface or a stepped uneven surface, but in the embodiment of the present application, it is of a flat slope without unevenness. The inclined portion 35 is formed with an inclined surface 35c inclined at a constant angle over the entire length thereof. Also, the slope 35c is inclined with respect to the reference surface S2 at an angle larger than the inclination angle of the slope 25c of the inclined portion 25 of the first side block 2. The inclination angle of the slope 35c with respect to the reference surface S2 is not particularly limited, but as an example, it is 10° to 40°.

The height of the tip 35a of the inclined portion 35 is lower than the height of the second region 21 surrounding the groove 23 of the first side block 2. In other words, the wall of the groove 23 is higher than the end of the slope 35c located in the groove 23 with respect to the reference surface S2. In this case, the tip 35a of the inclined portion 35 is completely accommodated in the groove 23, and even if the inclined portion 35 has a slope 35c in which the height of the inclined portion 35 gradually decreases toward the tip 35a, excellent cut resistance performance can be secured. The height at the end of the slope 35c (the tip 35a of the inclined portion 35) can be zero.

In the embodiment of the present application, the height of the starting end (base edge 35b of the inclined portion 35) of the slope 35c is the same as the height of the third region 32. Also, the wall of the groove 23 is higher than the base edge 35b of the inclined portion 35 with respect to the reference plane. In this case, the entire portion of the inclined portion 35 located in the groove 23 is completely accommodated in the groove 23, and excellent cut resistance can be ensured.

As described above, the inclined portion 35 is connected to the first side block 2 in the groove 23 of the first side block 2. Further, both sides of the slope 35c in the tire radial direction are connected to the wall of the groove 23. That is, a part of the first side block 2 and the second side block 3 is continuous in the tire radial direction. In this case, the rigidity of the side block can be increased, and the effect of improving the cut resistance becomes more remarkable.

The inclined portion 35 can be formed parallel with the tire circumferential direction, but in the embodiment of the present application, the inclined portion 35 extends inward in the tire radial direction toward the side of the direction D31. That is, in the inclined portion 35, the tip 35a at the side of the direction D31 is located at the inner side of the tire radial direction compared with the base edge 35b at the side of the direction D32, or in other words, as the distance from the starting point 35d of the slope 35c increases, the inclined portion is tilted with respect to the tire circumferential direction such that it is gradually positioned inward in the tire radial direction.

The inclined portion 35 is formed, for example, longer in the tire circumferential direction than in the tire radial direction. In the embodiment of the present application, the length (width) of the inclined portion 35 in the tire radial direction becomes narrower toward the side of the first circumferential direction D31. Also, the width of the inclined portion 35 is wider than the width of the side rib 8.

The configuration of the tire 1 in accordance with the embodiment of the present application has been described above, and next, the functions of the tire 1 in accordance with the embodiment of the present application are explained.

First, since the inclined portion 35 including the slope 35c of the second side block 3 extends into the groove 23 of the first side block 2, the inclined portion 35 can secure the rubber thickness of the region between the two side blocks. As a result, the cut resistance performance of the sidewall 12 can be improved. In particular, it is preferable that both sides of the slope 35c in the tire radial direction are connected to the first side block 2 in the groove 23.

By the way, the mud drainage between the two side blocks could be hindered by the inclined portion 35. Considering this, the embodiment of the present application has the inclined portion 35 which has an inclined portion 35c whose height from the reference surface S2 gradually decreases toward the side of the tip end 35a of the inclined portion 35. As a result, mud can be smoothly drained even at the portion where the inclined portion 35 is formed.

Moreover, the third region 32 of the main portion 34 having a low height from the reference surface S2 is arranged adjacent to the inclined portion 35. That is, the third region 32 is located between the second region 21 of the main portion 24 of the first side block 2 having a high height from the reference surface S2 and the fourth region 31 of the main portion 34 of the second side block 3. As a result, mud between the second region 21 and the fourth region 31 can be drained via not only the inclined portion 35 but also the third region 32, and therefore, the mud drainage performance due to the block shape as connected in the tire circumferential direction can be effectively suppressed.

Also, the height of the region on the side of the base edge 35b connected to the third region 32 of the inclined portion 35 is higher than the height of the region at the side of the tip 35a of the inclined portion 35. As a result, the rubber thickness of the region at the side of the third region 32 of the inclined portion 35 can be sufficiently secured, and the cut resistance performance of the region at the side of the third region 32 of the inclined portion 35 can be improved.

The height of the region at the side of the tip 35a of the inclined portion 35 is lower than the region at the side of the base edge 35b, but the region at the side of the tip 35a of the inclined portion 35 is sandwiched by the second region 21 at both sides thereof in the tire radial direction D2 in the groove 23 of the first side block 2. As a result, by forming the slope 35c, excellent cut resistance can be ensured even if the height of the slope 35 is gradually reduced toward the side of the tip 35a of the slope 35.

By the way, the first side block 2 and the second side block 3 include elements such as surfaces and edges. Also, since the portions that come into contact with the mud, sand and rock are formed in uneven shapes, the areas that come into contact with the mud, sand and rock are increased. In addition, the surfaces and edges of uneven shapes at various positions can easily touch mud, sand and rock. In this way, the traction performance can be improved by forming the uneven shapes in the portions that come into contact with the mud, sand and rock.

Also, since the sidewall 12 is provided with the space 9, it is possible to generate a traction effect due to the edge formed around the space S. As a result, for example, the mud drainage performance can be further improved, and a large traction performance can be exhibited. Also, since the entire circumference of the space 9 is surrounded by the second region 21 and the inclined portion 35 (slope 35c), the edge of the space 9 also extends in an annular shape. As a result, for example, the traction effect can be generated in various directions of the tire radial direction D2 and the tire circumferential direction D3.

As described above, the tire 1 according to the embodiment of the present application includes a sidewall 12 on which a plurality of side blocks are formed. The plurality of side blocks include a first side block 2 and a second side block 3 which are alternately arranged at an interval in the tire circumferential direction. The first side block 2 has a groove 23 extending in the tire circumferential direction from a side surface facing the second side block 3, and the second side block 3 has an inclined portion 35 which extends in the tire circumferential direction to be formed over the groove 23 of the first side block 2. In addition, the inclined portion 35 includes an inclined surface 35c inclined such that the height from the reference surface S2 becomes lower toward the adjacent first side block 2.

According to the structure above, the inclined portion 35 of the second side block 3 can secure the rubber thickness of the region between the first side block 2 and the second side block 3. Moreover, since the inclined portion 35 has a slope 35c whose height becomes lower toward the first side block 2, mud drainage between the first side block 2 and the second side block 3 can be carried out via the inclined portion 35. As a result, it is possible to achieve both the cut resistance performance and the mud drainage performance of the sidewall 12.

Also, in the tire 1 according to the embodiment of the present application, the inclined portion 35 of the second side block 3 is connected to the first side block 2 in the groove 23.

Due to the configuration above, it is possible to prevent the edge length of the end portion of the first side block 2 at the rear side in the tire main rotation direction from being shortened. As a result, an edge length extending in the tire radial direction D2 of the first side block 2 can be secured.

Also, in the tire 1 according to the embodiment of the present application, the first side block 2 is formed larger inward in the tire radial direction than the groove 23 to which the inclined portion 35 is connected. Also, the first side block 2 has an inclined portion 25 including a slope 25c extending to the side opposite to the groove 23 and gradually decreasing in height from the reference surface S2 toward the side of the tip.

According to the configuration as described above, the effect of improving the cut resistance performance becomes more remarkable due to the large first side block 2. Moreover, the tip portion of the inclined portion 35 in which its height is lowered in order to improve the mud drainage performance can exist in the groove 23, the three sides of which is surrounded by the second region 21 of the first side block 2. As a result, excellent cut resistance can be ensured even if the height is gradually reduced toward the tip of the inclined portion 35. Also, since the inclined portion 25 has an inclined surface 25c inclined such that the height gradually decreases toward the side of the tip, the cut resistance performance can be improved while ensuring good mud drainage performance.

In addition, the tire 1 according to the embodiment of the present application has a space 9 which is formed in the groove 23 of the first side block 2, and which is surrounded by the second region 21 of the main portion 24 and the inclined portion 35 of the second side block 3, thereby being lower than the surroundings from the reference surface S2.

According to the configuration as described above, the edge formed around the space 9 can be a ring shape, and the effect of improving the side traction performance becomes more remarkable.

Also, in the tire 1 according to the embodiment of the present application, the third region 32 of the second side block 3 is interposed between the fourth region 31 and the inclined portion 35.

According to the configuration as described above, mud between the first side block 2 and the fourth region 31 of the second side block 3 can be drained via the third region 32.

It is noted that the tire 1 is not limited to the configuration of the embodiment described above and is not limited to the functions and effects mentioned above. Also, the tire 1 can be modified in various ways without departing from the gist of the description of the present application. For example, one or a plurality of the configurations described next can be arbitrarily selected to be adopted to improve the configurations of the embodiment of the present application.

(1) In the tire 1 according to the embodiment of the present application, the inclined portion 35 of the second side block 3 is connected to the first side block 2 in the groove 23 of the first side block 2. However, the tire 1 is not limited to such a configuration. For example, the inclined portion 35 is not connected to the first side block 2 inside the groove 23 but can be connected to the first side block 2 outside the groove 23. That is, if the inclined portion 35 is connected to the first side block 2 outside the groove 23, there can be a space between the side wall of the groove 23 and the inclined portion 35. Alternatively, it is possible that the inclined portion 35 is not connected to the first side block 2.

(2) In the tire 1 according to the embodiment of the present application, the first side block 2 includes an inclined portion 25 having an inclined surface 25c. However, the tire 1 is not limited to such a configuration. For example, it is possible that the first side block 2 does not include the inclined portion 25 having the inclined surface 25c.

(3) In the tire 1 according to the embodiment of the present application, the inclined portion 35 of the second side block 3 is formed not to reach the end of the groove 23 of the first side block 2. The groove 23 has a space 9 in which the bottom surface 9a is the same height as the reference surface S2. However, the tire 1 is not limited to such a configuration. For example, the inclined portion 35 can be formed to reach the end of the groove 23.

(4) In the tire 1 according to the embodiment of the present application, the first side block 2 includes a second region 21 and a first region 22, each having a different height with each other with respect to the reference surface S2. However, the tire 1 is not limited to such a configuration. For example, the first side block 2 can have the same height over the entire area thereof.

(5) In the tire 1 according to the embodiment of the present application, the second side block 3 includes a fourth region 31 and a third region 32, each having a different height with reach other with respect to the reference surface S2. However, the tire 1 is not limited to such a configuration. For example, the second side block 3 can have the same height over the entire area thereof.

(6) In the tire 1 according to the embodiment of the present application, the first region 22, the second region 21, the third region 32, and the fourth region 31 are arranged in this order along the tire circumferential direction D3. That is, the high protrusions and the low protrusions are alternately arranged along the tire circumferential direction D3. However, the tire 1 is not limited to such a configuration.

For example, the first region 22 can be arranged between the second region 21 and the third region 32 in the tire circumferential direction D3. Also, the third region 32 can be arranged between the fourth region 31 and the first region 22 in the tire circumferential direction D3.

(7) In the tire 1 according to the embodiment of the present application, the height of the second region 21 from the reference surface S2 is higher than the height of the third region 32 from the reference surface S2. However, the tire 1 is not limited to such a configuration. For example, the height of the second region 21 can be lower than the height of the third region 32. Also, the height of the second region 21 can be the same as the height of the third region 32.

(8) In the tire 1 according to the embodiment of the present application, the height of the fourth region 31 from the reference surface S2 is higher than the height of the first region 22 from the reference surface S2. However, the tire 1 is not limited to such a configuration. For example, the height of the fourth region 31 can be lower than the height of the first region 22. Also, the height of the fourth region 31 can be the same as the height of the first region 22.

(9) The tire 1 according to the embodiment of the present application has two types of side blocks, a first side block 2 and a second side block 3, such that the first side block 2 and the second side block 3 are arranged alternately one by one in the tire circumferential direction D3. However, the tire 1 is not limited to such a configuration.

For example, there can be a region where the first side blocks 2 (or the second side blocks 3) are continuously arranged in the tire circumferential direction D3 at a part in the tire circumferential direction D3. Also, the sidewall 12 can be further provided with a third side block different from the first side block 2 and the second side block 3, such that the first side block 2, the second side block 3 and the third side block are arranged in this order along the tire circumferential direction D3.

Figure 8A:
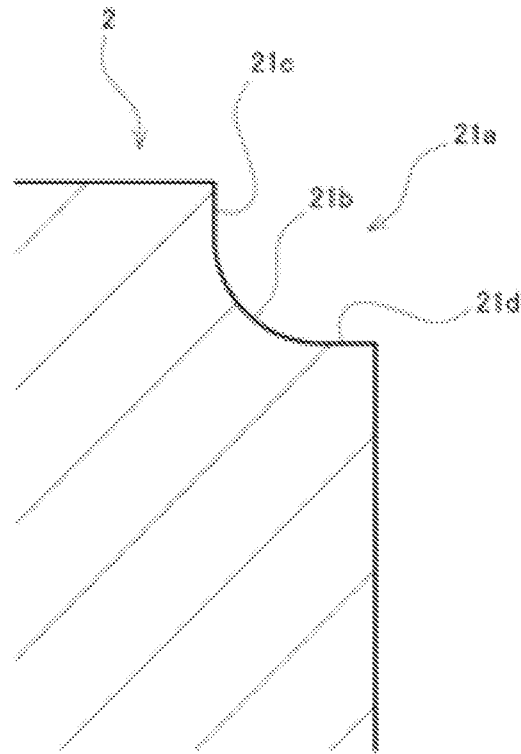
FIG. 8A is an enlarged cross-sectional view of a part of a side block group.

(10) Also, in the tire 1 according to the embodiment of the present application, the recesses 21a, 31a are formed along the edge of the high protrusion of each side block as shown in FIG. 8A (in FIGS. 8A and 8B, only the recess 21a of the first side block 2 is shown), such that the curved surface 21b is convex toward the inside of the first side block 2. It is noted that the recesses 21a, 31a can, for example, include plane surfaces 21c, 21d at the both sides of the curved surface 21b, as shown in FIG. 8A.

Figure 8B:
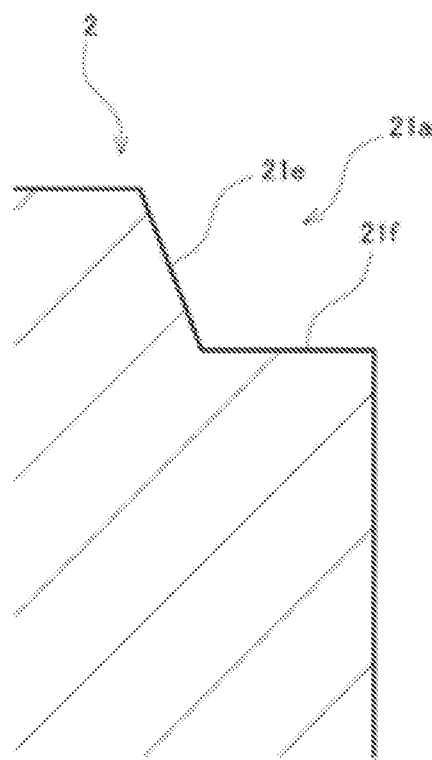
FIG. 8B is an enlarged cross-sectional view of a part of a side block group.

However, the tire 1 is not limited to such a configuration. For example, the recesses 21a, 31a can include two planes 21e, 21f intersecting with each other so as to be convex toward the inside of the protrusion 2 as shown in FIG. 8B. It is noted that the intersection angle of the two planes 21e, 21f can be an obtuse angle as shown in FIG. 8B, but it can be a right angle.

Figure 8C:
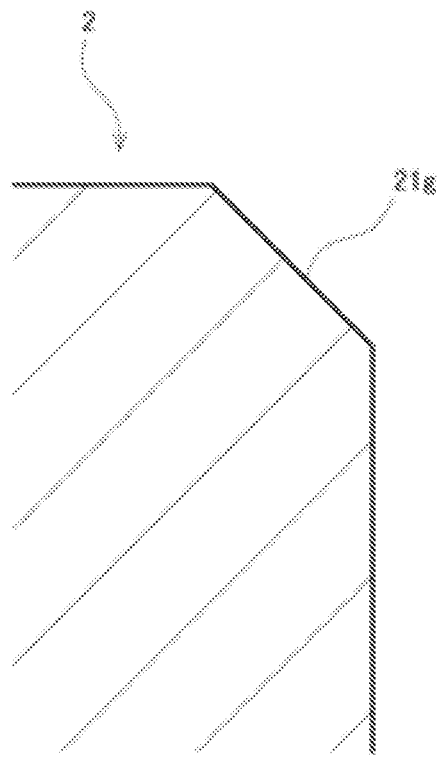
FIG. 8C is an enlarged cross-sectional view of a part of a side block group.
Figure 8D:
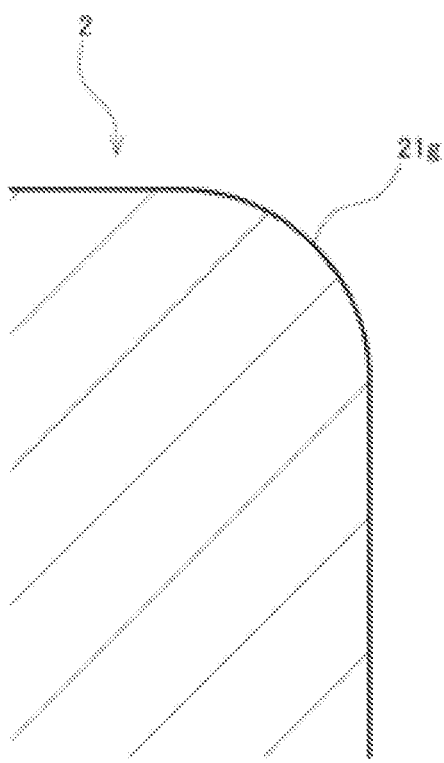
FIG. 8D is an enlarged cross-sectional view of a part of a side block group.

Also, instead of the recesses 21a, 31a, each side block can be provided with a slope 21g along the edge of the end of the high protrusion portion, as shown in FIGS. 8C and 8D (note that in FIGS. 8C and 8D, only the first side block 2 is shown). The slope 21g can be, for example, a flat slope without unevenness as shown in FIG. 8C. Alternatively, the slope 21g can be gently curved so as to be convex toward the outside of the side block as shown in FIG. 8D.

EXPLANATION OF THE REFERENCES IN THE DRAWINGS

References of the drawings:
1: Tire,
2: first side block,
3: second side block,
8: side rib,
9: space,
11: bead,
12: sidewall,
13: tread,
14: carcass,
21: second region,
22: first region,
23: groove,
24: main portion,
25: inclined portion,
25a: tip, 25b: base edge,
25c: slope,
31: fourth region,
31a: recessed portion,
32: third region,
34: main part,
35: inclined part,
35a: tip,
35b: base edge,
35c: slope,
D1: tire width direction,
D2: tire radial direction,
D3: tire circumferential direction,
S1: tire equatorial plane,
S2: reference plane

What is claimed is:

1. A tire having a tire radial direction and a tire circumferential direction, the tire comprising:
    a tread extending in the tire circumferential direction;
    a pair of sidewalls extended inward from the tread in the tire radial direction, each of the sidewalls having a sidewall reference plane; and
    a plurality of side block groups provided on at least one of the sidewalls, each of the side block groups protruding from the sidewall reference plane,
    wherein each of the side block groups comprises:
    a first side block; and
    a second side block arranged along with the first side block in the tire circumferential direction,
    wherein in each of said plurality of side block groups, the first side block has a groove extending from the second side block toward an inside of the first side block in the tire circumferential direction,
    wherein in each of said plurality of side block groups, the second side block has a slope whose height from the reference plane becomes lower toward the first side block, such that the slope extends into the groove of the first side block, wherein the first side block comprises:
    a first region; and
    a second region arranged in the tire circumferential direction of the first region, the second region being higher than the first region with respect to the reference plane,
    wherein the second side block comprises:
    a third region;
    a fourth region arranged in the tire circumferential direction of the third region,
    wherein the first region, the second region, the third region and the fourth region are arranged in this order in the tire circumferential direction.

2. The tire according to claim 1, wherein the slope slop of the second side block is connected to the first side block inside the groove of the first side block.

3. The tire according to claim 1, wherein the groove ends inside the first side block,
    wherein the groove of the first side block, which extends toward the inside of the first side block from the second side block in each of said plurality of side block groups, is inclined inward with respect to the tire radial direction.

4. The tire according to claim 3, wherein the tire circumferential direction consists of a tire main rotation direction and an opposite direction of the tire main rotation direction,
    wherein the groove of the first side block, which extends toward the inside of the first side block from the second side block in each of said plurality of side block groups, is inclined inward with respect to the tire main rotation direction.

5. The tire according to claim 1, wherein the slope of the second side block has a shape in which a length thereof in the tire circumferential direction is longer than that in the tire radial direction,
    wherein the slope of the second side block, which extends from the second side block to the first side block in each of said plurality of side block groups, is inclined inward with respect to the tire radial direction.

6. The tire according to claim 1, wherein a groove wall of the groove is higher with respect to the reference plane than an end of the slope inside the groove.

7. The tire according to claim 6, wherein the groove ends inside of the first side block,
    wherein the end of the slope is located away from where the groove ends.

8. The tire according to claim 6, wherein both sides of the slope in the tire radial direction are connected to the groove wall.

9. The tire according to claim 1, wherein the groove wall of the groove is higher with respect to the reference plane than a starting point of the slope.

10. The tire according to claim 1, wherein the first side block comprises:
    a first region; and
    a second region arranged in the tire circumferential direction of the first region,
    wherein the second side block comprises:
    a third region;
    a fourth region arranged in the tire circumferential direction of the third region; and
    the slope extended from the third region in the tire circumferential direction toward the first side block,
    wherein the third region has a height same as, or lower than, that of a base edge of the slope, such that the third region is adjacent to the slope.

11. The tire according to claim 10, wherein the fourth region has a height from the reference plane higher than a starting point of the slope, and the fourth region is located away from the slope.

12. The tire according to claim 1, wherein the first side block comprises:
    a first region;
    a second region arranged in the tire circumferential direction of the first region; and
    an inclined surface extending from the second region, the inclined surface having a height lowering as the inclined surface comes close to an end in the tire circumferential direction.

13. The tire according to claim 12, wherein the slope of the second side block has an inclination angle with respect to the reference plane more than that of the inclined surface of the first side block.

14. The tire according to claim 1, wherein the second region of the first side block is higher than the third region of the second side block with respect to the reference surface,
    wherein the fourth region of the second side block is higher than the first region of the first side block with respect to the reference plane.

15. The tire according to claim 1, wherein at least one of the side block groups further comprises a side rib protruded from the reference plane and extending in the tire circumferential direction, wherein the side rib is higher than the first region of the first side block and the third region of the second side block, such that the second region of the first side block is connected to the fourth region of the second side block via the side rib.

* * * * *